Figure 22:
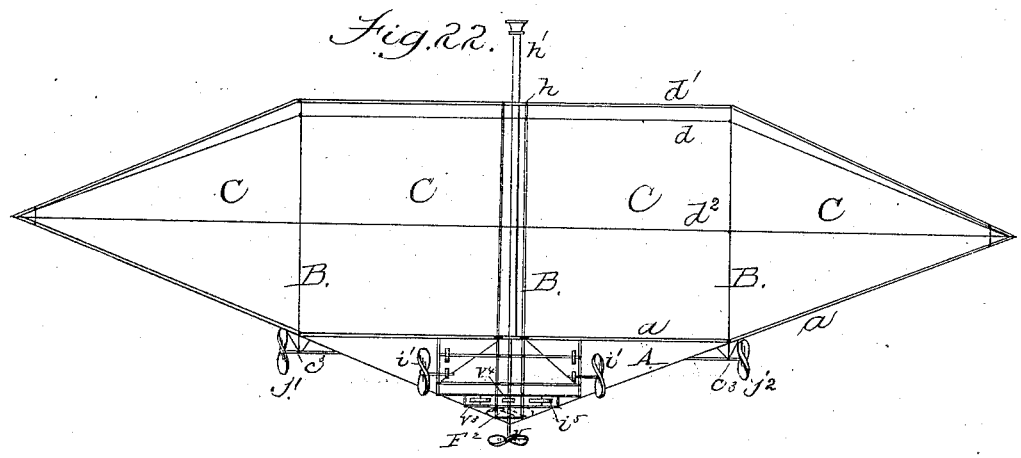

(No Model.)
E. F. FALCONNET.
VESSEL FOR AERIAL NAVIGATION.
No. 311,888. Patented Feb. 10, 1885.
12 Sheets—Sheet 1.
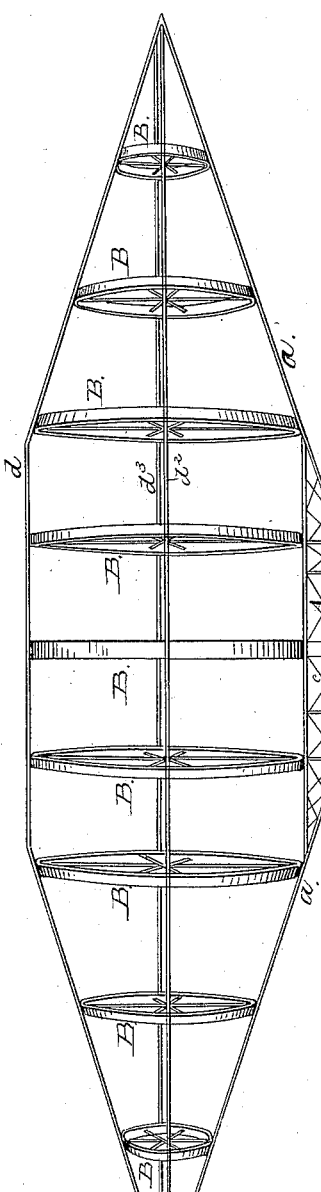
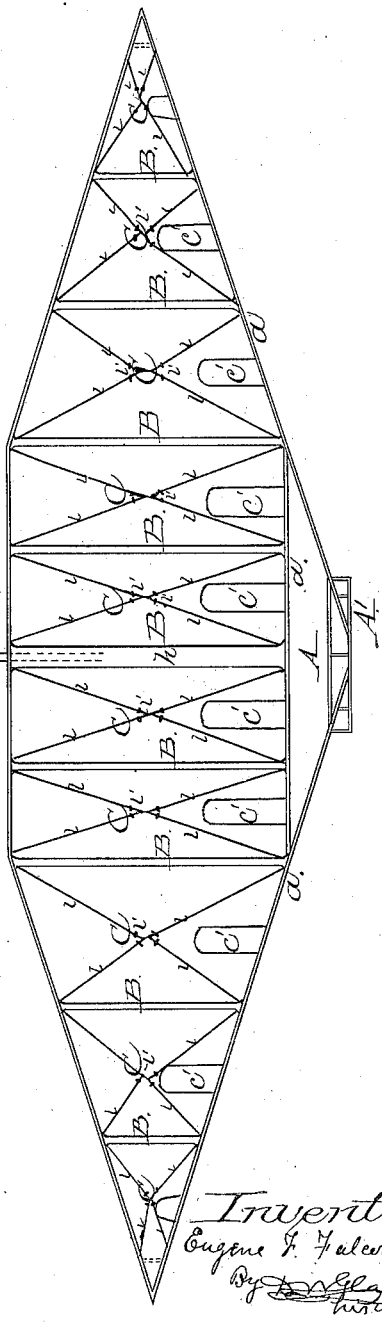
Attest:
T. Walter Fowler.
Henry Glassie
Inventor:
Eugene F. Falconnet
By Glassie
his atty.

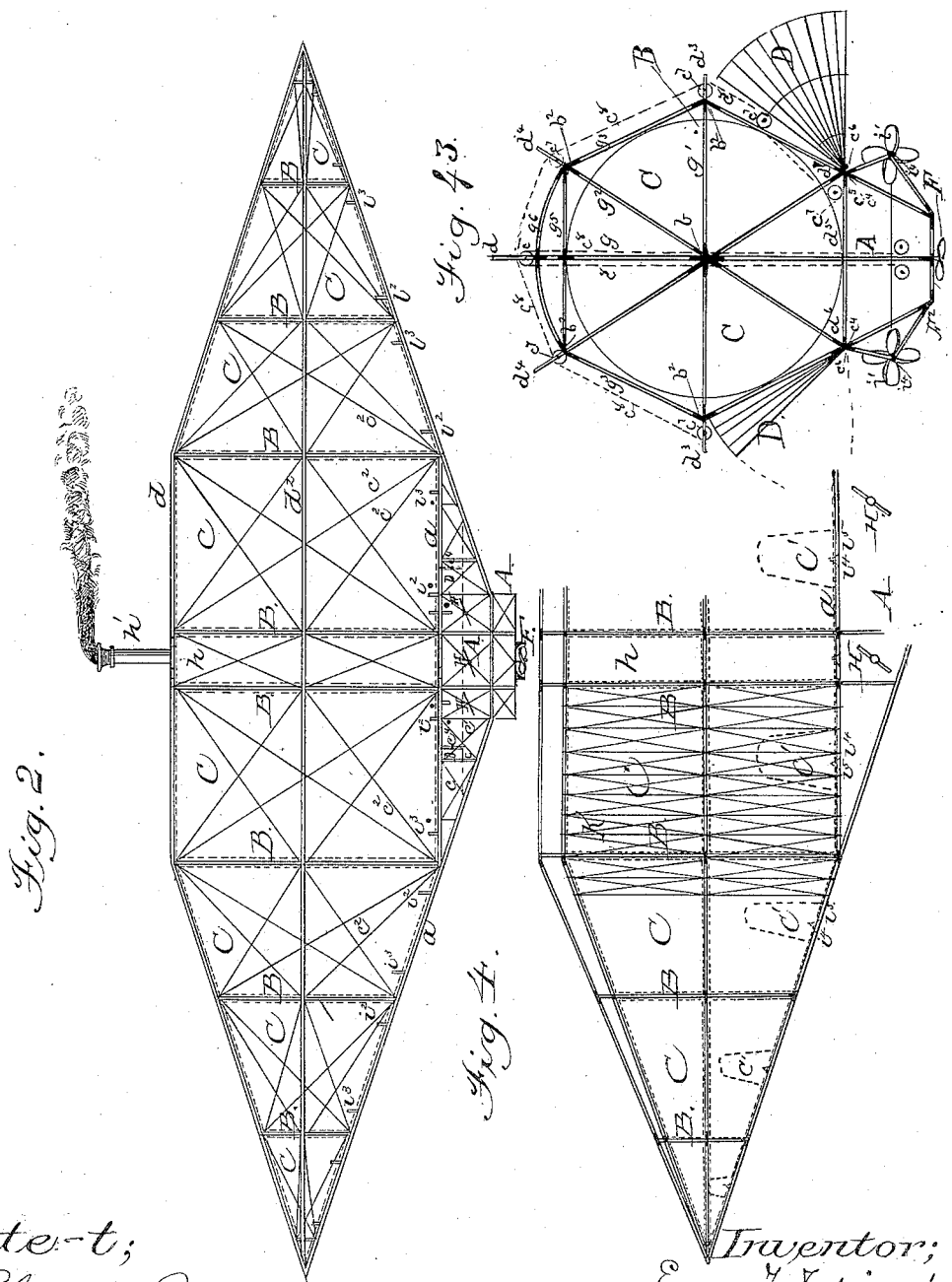

(No Model.) 12 Sheets—Sheet 3.
E. F. FALCONNET.
VESSEL FOR AERIAL NAVIGATION.
No. 311,888. Patented Feb. 10, 1885.
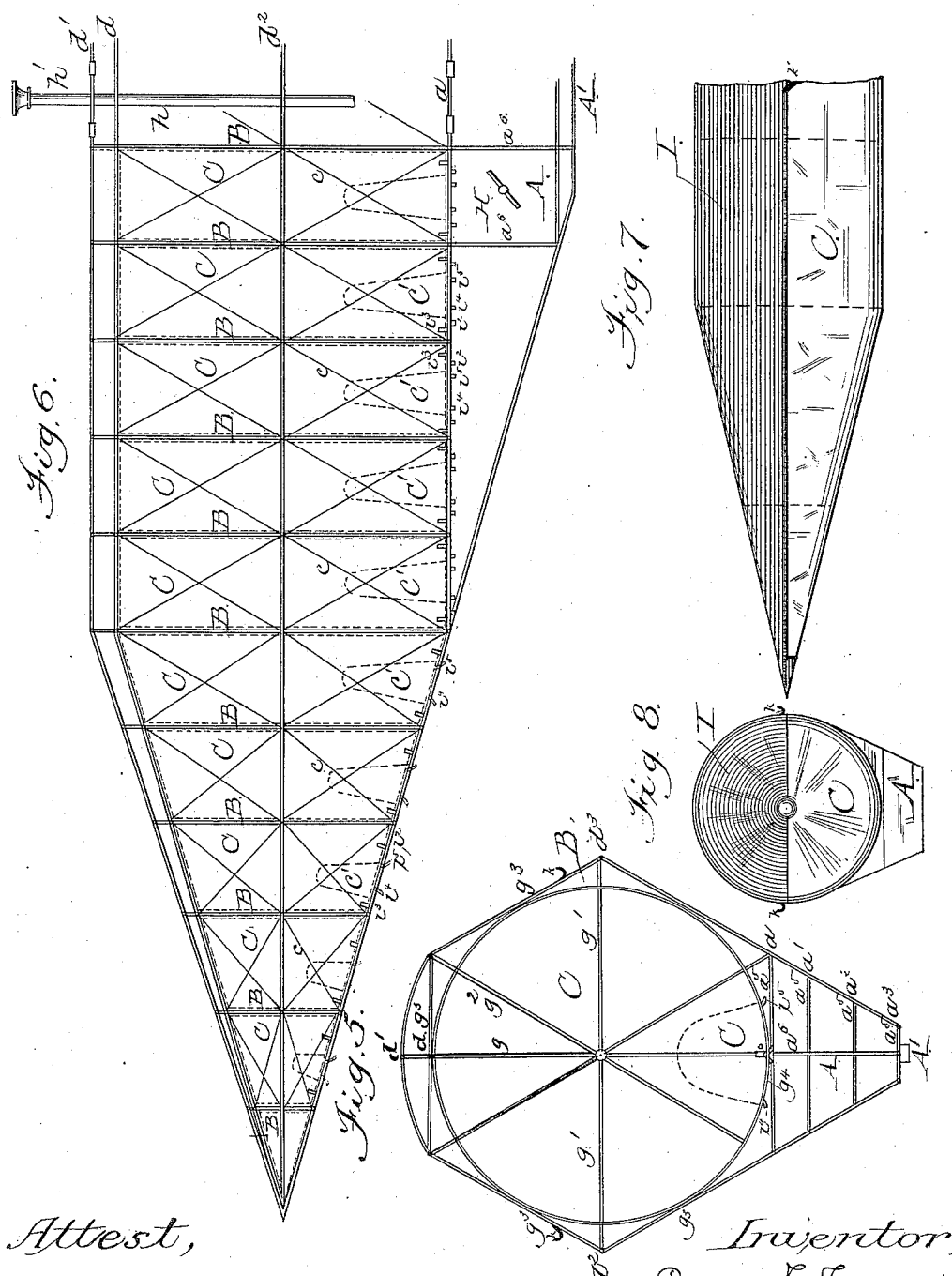
Attest,
T. Walter Fowler
Henry Glassie
Inventor;
Eugene F. Falconnet
By D. W. Glassie
his Attorney (No Model.)  12 Sheets—Sheet 4.
E. F. FALCONNET.
VESSEL FOR AERIAL NAVIGATION.
No. 311,888. Patented Feb. 10, 1885.
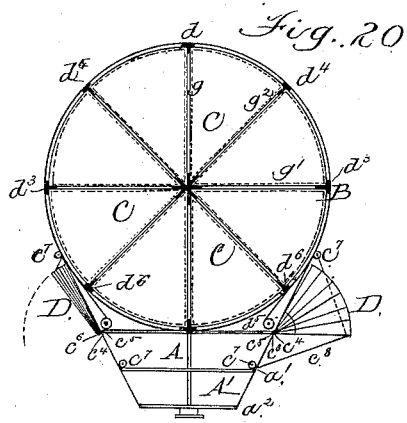
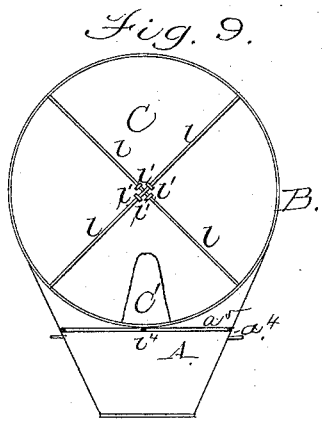
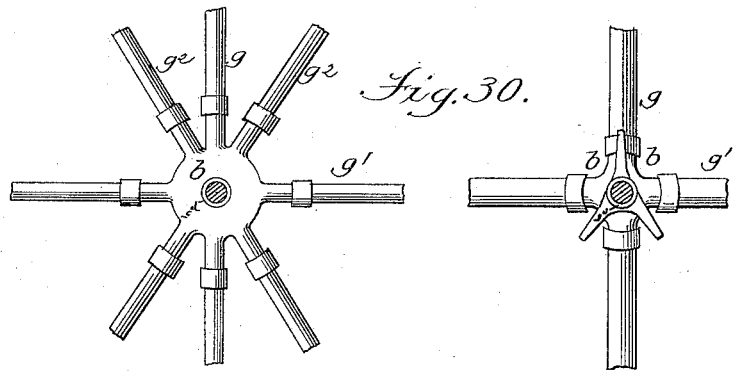
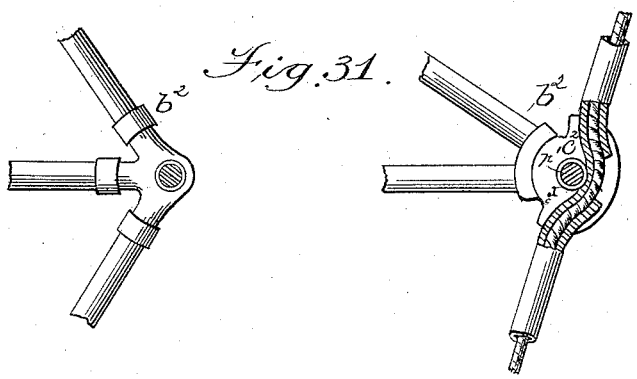
Attest:
T. Walter Fowler
Henry Glassie
Inventor:
Eugene F. Falconnet
By Glassie
his attorney (No Model.)
12 Sheets—Sheet 5.
E. F. FALCONNET.
VESSEL FOR AERIAL NAVIGATION.
No. 311,888. Patented Feb. 10, 1885.
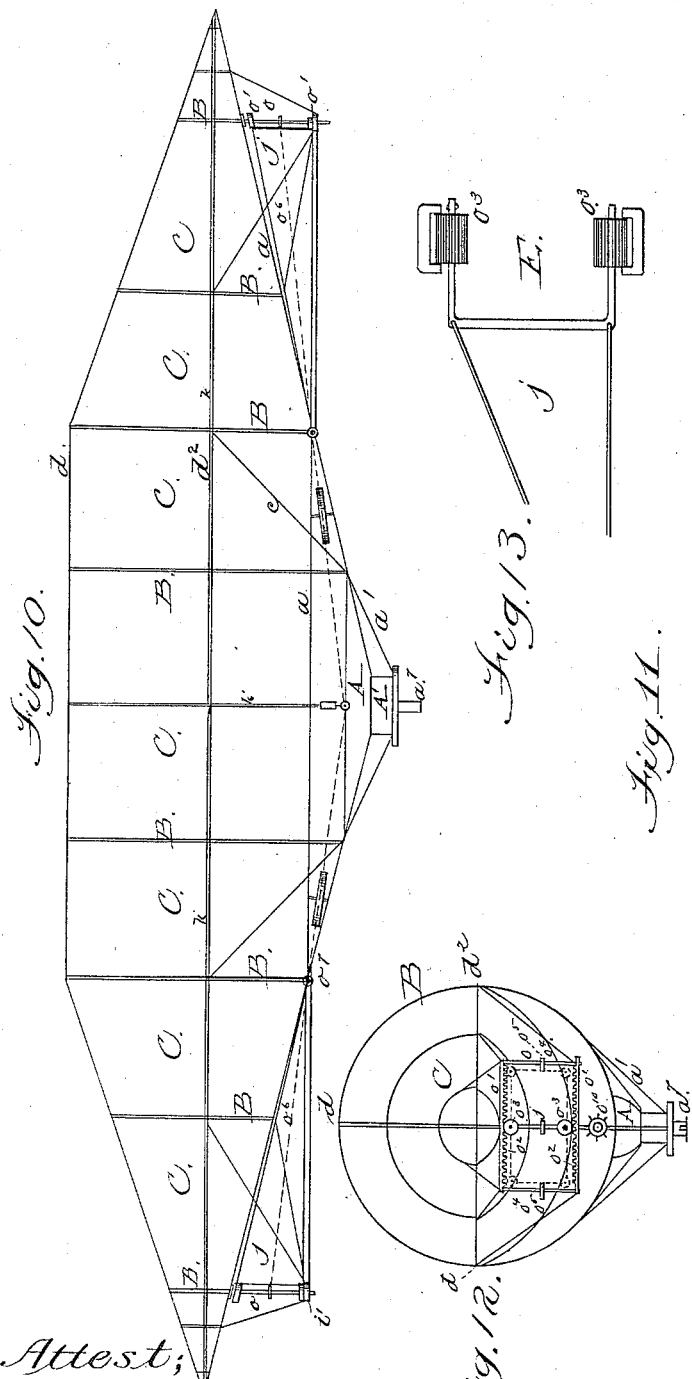
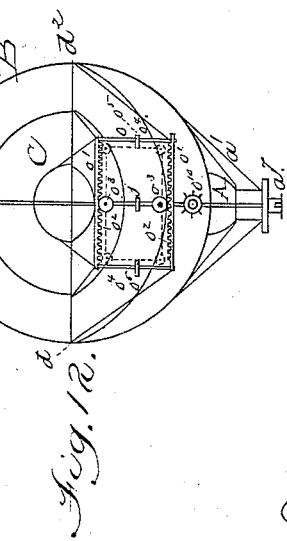
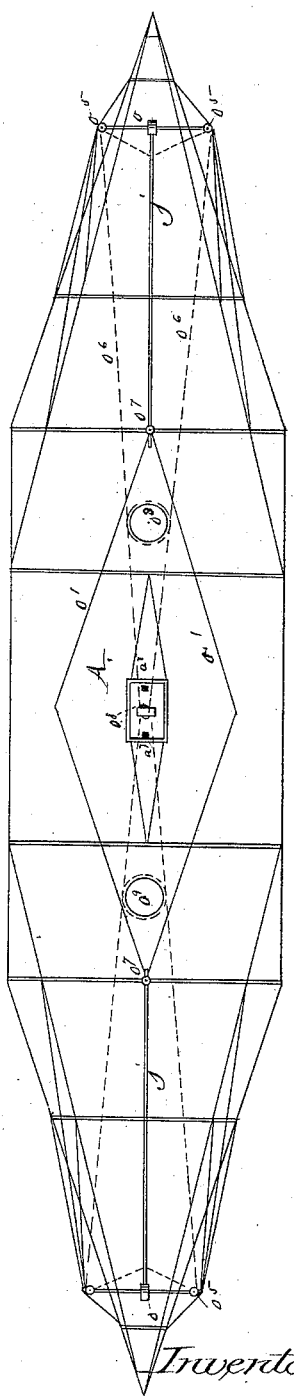
Attest:
T. Walter Fowler,
Henry Glassie
Inventor:
Eugene F. Falconnet (No Model.) 12 Sheets—Sheet 6.
E. F. FALCONNET.
VESSEL FOR AERIAL NAVIGATION.
No. 311,888. Patented Feb. 10, 1885.
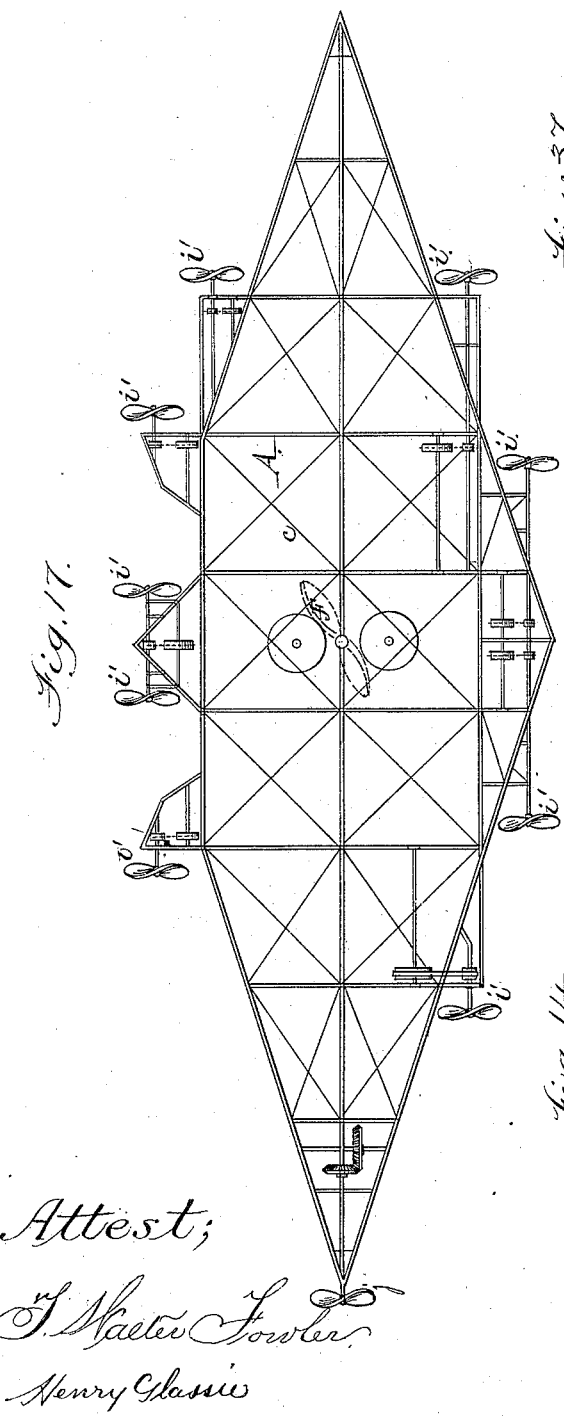
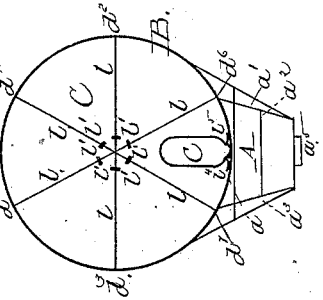
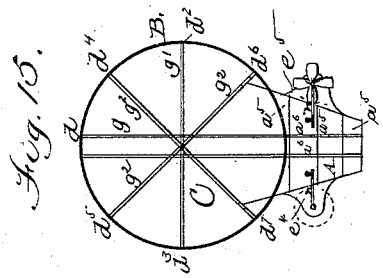
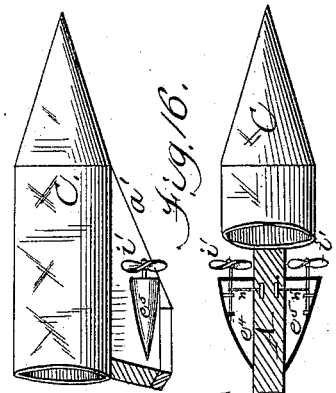
Attest;
J. Walter Fowler
Henry Glassie
Inventor;
Eugene F. Falconnet
his Attorney (No Model.) 12 Sheets—Sheet 7.
E. F. FALCONNET.
VESSEL FOR AERIAL NAVIGATION.
No. 311,888. Patented Feb. 10, 1885.
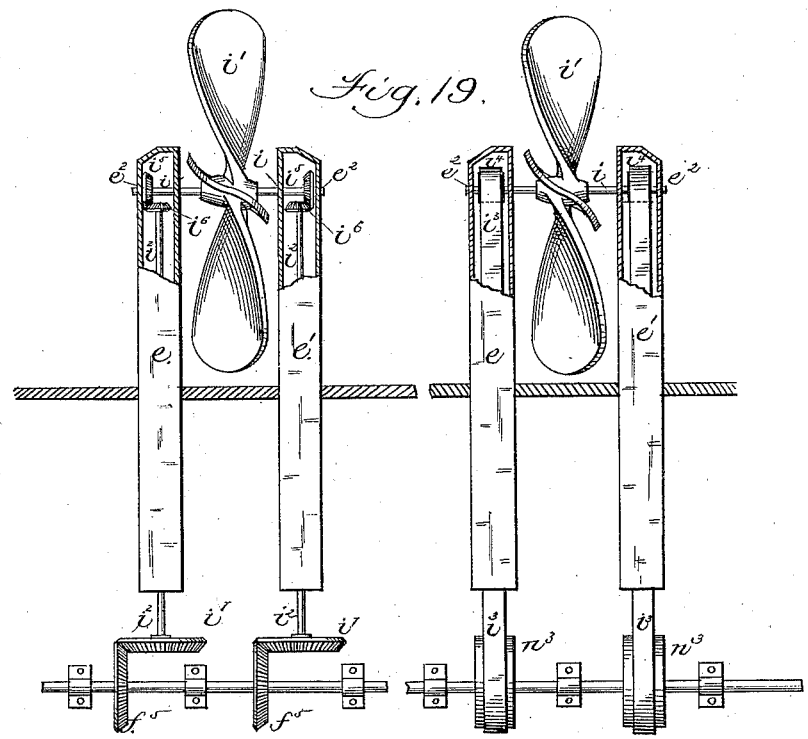
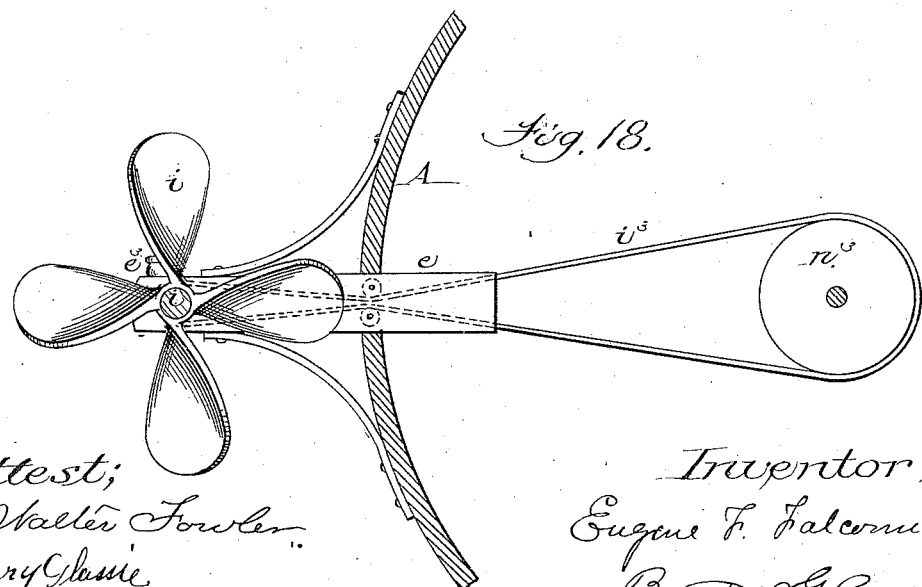
Attest:
J. Walter Fowler
Henry Glassie
Inventor:
Eugene F. Falconnet
By Henry Glassie
his attorney

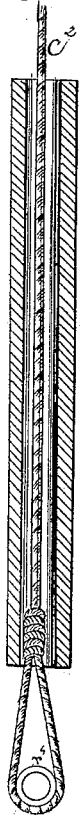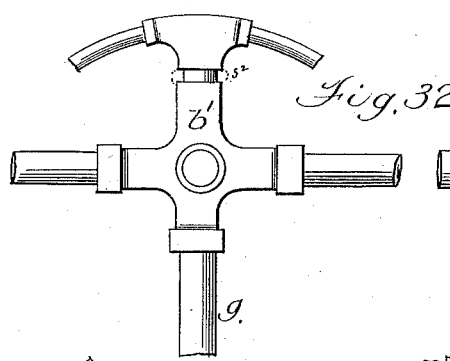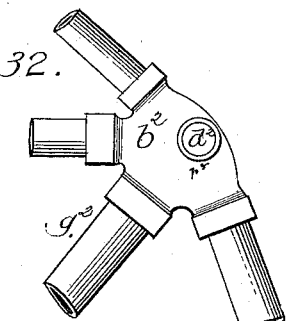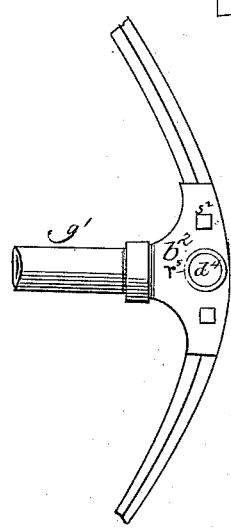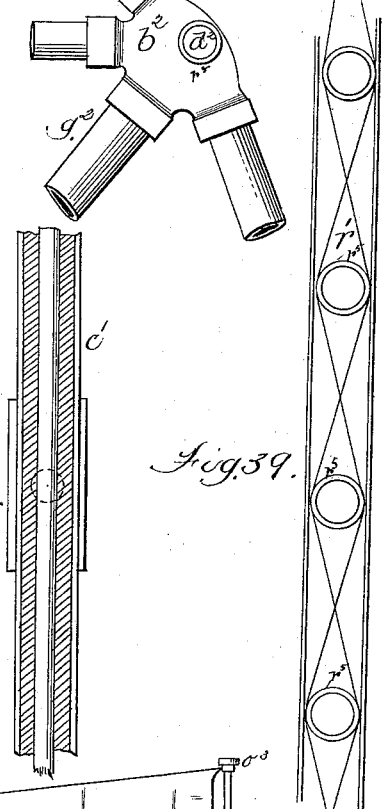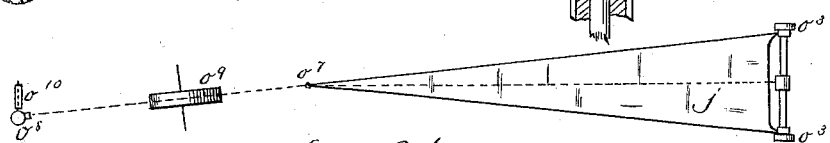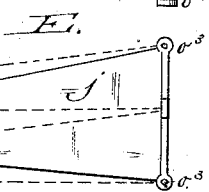

(No Model.)
12 Sheets—Sheet 9.

E. F. FALCONNET.
VESSEL FOR AERIAL NAVIGATION.

No. 311,888. Patented Feb. 10, 1885.

Attest;
S. Walter Fowler
Henry Glassie

Inventor;
Eugene F. Falconnet
By D. L. Glassie
his Attorney

N. PETERS. Photo-Lithographer, Washington, D. C.

(No Model.)
12 Sheets—Sheet 10.
E. F. FALCONNET.
VESSEL FOR AERIAL NAVIGATION.
No. 311,888. Patented Feb. 10, 1885.
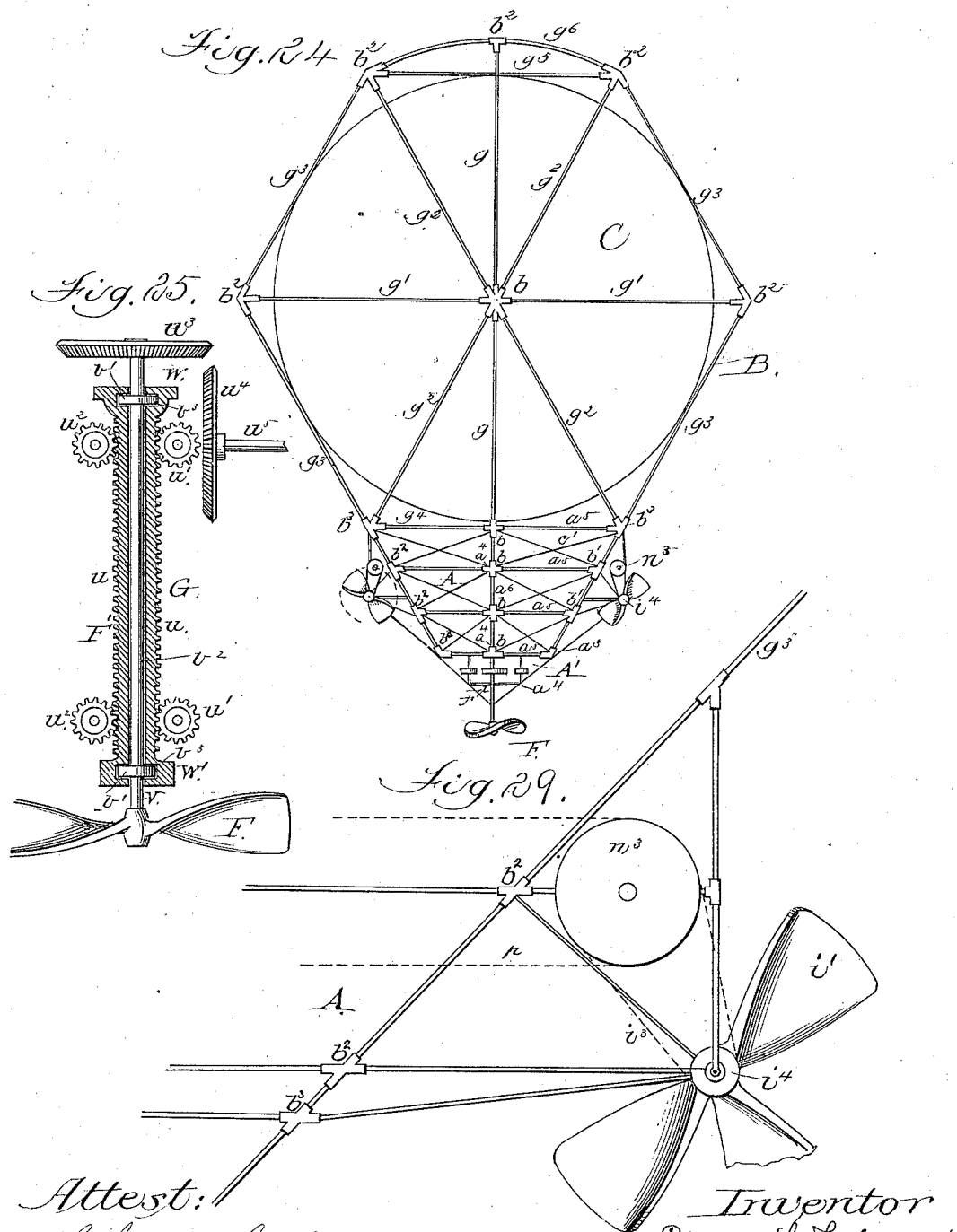

(No Model.) 12 Sheets—Sheet 11.

E. F. FALCONNET.
VESSEL FOR AERIAL NAVIGATION.

No. 311,888. Patented Feb. 10, 1885.

Attest:
J. Walter Fowler
Henry Glassie

Inventor;
Eugene F. Falconnet
By D. H. Glassie
his Attorney.

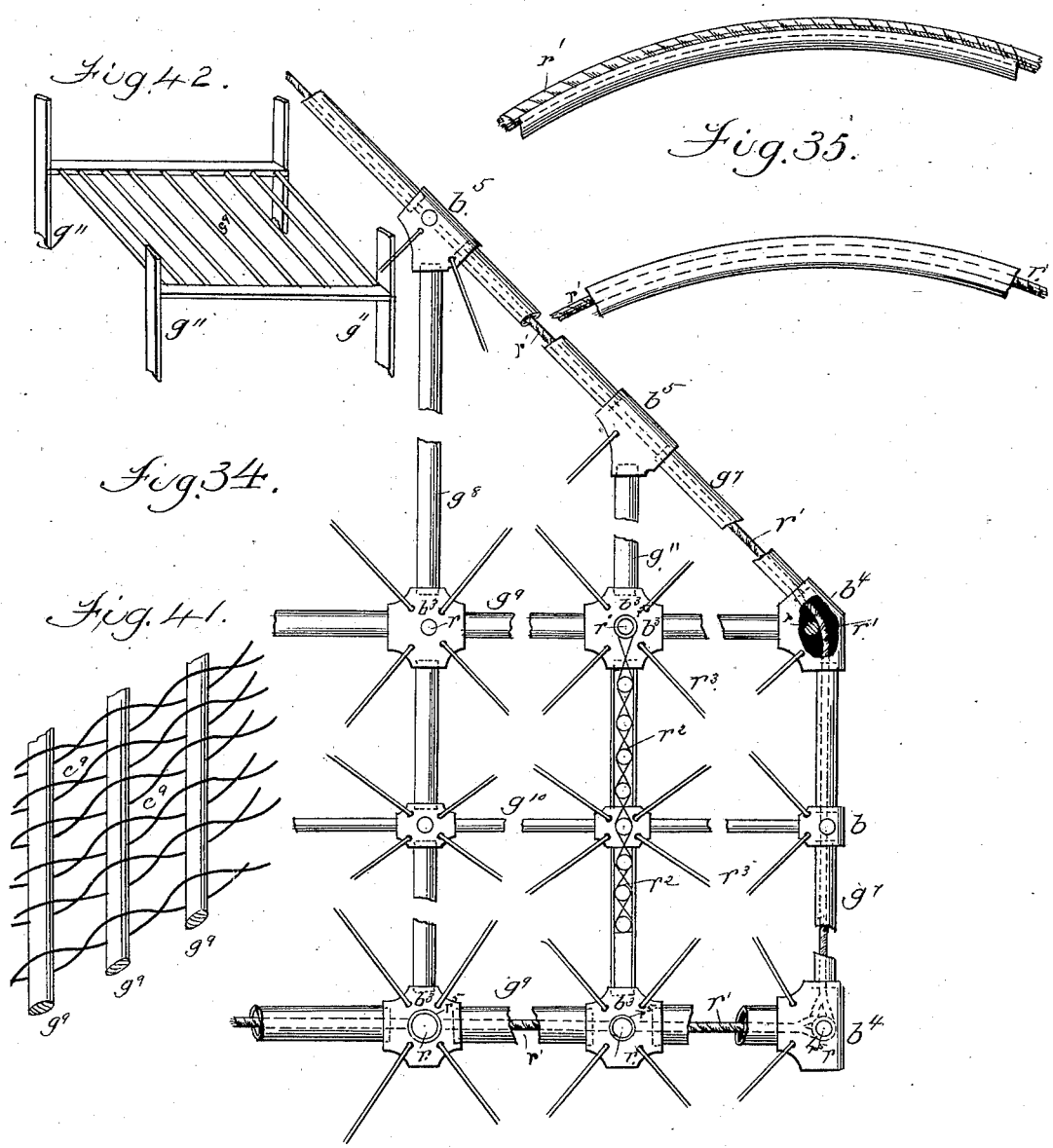

UNITED STATES PATENT OFFICE.

EUGENE F. FALCONNET, OF NASHVILLE, TENNESSEE.

VESSEL FOR AERIAL NAVIGATION.

SPECIFICATION forming part of Letters Patent No. 311,888, dated February 10, 1885.

Application filed November 8, 1883. (No model.)

*To all whom it may concern:*

Be it known that I, EUGENE F. FALCONNET, a citizen of the United States, residing at Nashville, in the county of Davidson and State of Tennessee, have invented certain new and useful Improvements in Vessels for Aerial Navigation, of which the following is a specification, reference being had therein to the accompanying drawings.

My invention relates to certain new and useful improvements in that class of vessels for aerial navigation which are designed to be actuated, steered, and handled by internally-arranged propulsive machinery through externally-arranged attachments; and it consists in constructing the hull of the vessel on one general frame of metal, joined together at every available point by suitable angle blocks or joints, in thoroughly bracing and securing the same at the several intersections, and also in carrying upward from said hull at intervals from bow to stern a series of bulk-heads constructed of metal, preferably of tubing or channel-iron, substantially stayed, braced, and secured at their several intersections, the diameter of which will comport with the external form of the vessel.

It also consists, when desired, in constructing double bulk-heads amidships of the vessel, at such a distance apart that a space sufficient is left for the passage of the smoke-stack, steam-pipes, and ventilators.

It further consists in strengthening the vessel and frame longitudinally by securing to the bulk-heads on the top, sides, and intermediate external longitudinal chords, which support the vessel longitudinally, and to which the gas-bags are also lashed; also, in introducing throughout the vessel vertical and transverse bracing-chords, to which the gas-bags may also be lashed.

It also consists in constructing the several gas-bags in cylindrical form and of a shape to comport with the exterior form of the vessel and to intersect them internally, when desired, with numerous cells, connected with each other by suitable valves, to regulate the equal distribution of the gas, and in building these bags of a size to fill the space between the bulk-heads longitudinally, the hull and top chord vertically, and the side chords laterally, so that when arranged in its proper compartment each bag can be lashed to the sides, top, and bottom, as well as to the bulk-heads, cross-girders, and other parts of the frame.

It also consists in introducing into the gas-bags an air-sack, for regulating and accommodating the expansion of the gas in high altitudes, and in providing such air-sack with inlet and outlet valves, and in so forming it that it may be wholly closed in or be made to protrude outward when safety demands it.

It also consists in overlaying aerial vessels with a light roof of any suitable material, to shield and protect the gas-bags from exposure, &c.

It further consists in so constructing the angle-blocks or elbows through which the several joints are formed and secured that the air may be forced from the entire frame and light gas be introduced therein, when desired; also, in so constructing the angle-blocks or elbows and connecting-tubes as to admit of the introduction therein of ties, cables, braces, and stays for securing the several parts together.

It also consists in constructing on the sides of the hull protruding diminishing projections, into which the axle-shaft of the side screws are carried, and within which the machinery for making connections with the side screws is arranged.

It also consists in protruding in pairs at right angles to the sides of the vessel series of stationary hollow beams provided with journal-bearings in their outer ends, to serve as supports and furnish bearings for propelling side screws; also, in arranging within such hollow beams connecting-gearing for engaging with and connecting the propelling side screws with propulsive machinery within the vessel; also, in the method of mounting propelling side screws for aerial vessels in stationary protruding hollow beams and operating them through connecting-gearings arranged within such beams.

It also consists in introducing amidships of the vessel a screw for raising and lowering the vessel, and in so connecting the same with actuating machinery that it can be raised and lowered and operated to work either upward or downward.

It also consists in introducing into such vessels a steering apparatus at each end of the vessel, so that it may be propelled either end forward with equal facility and steered from within the hull; also, in constructing the rudder of a single blade secured on a rudder-post mounted in a frame suspended from the under side of the vessel, and in so connecting and arranging the connecting cables, guys, chords, and gearing that it may be handled as readily and made to operate substantially the same as the rudder on a water-craft.

It also consists in arranging and connecting propulsive machinery within the hull of the vessel, that the side, fore, and aft screws, or any one or more of them, may be operated or reversed at the will of the sailing-master.

It also consists in arranging gutters and spoutings on the roof or gas-bags in a way to secure such quantities of water as may be requisite.

Figure 23:
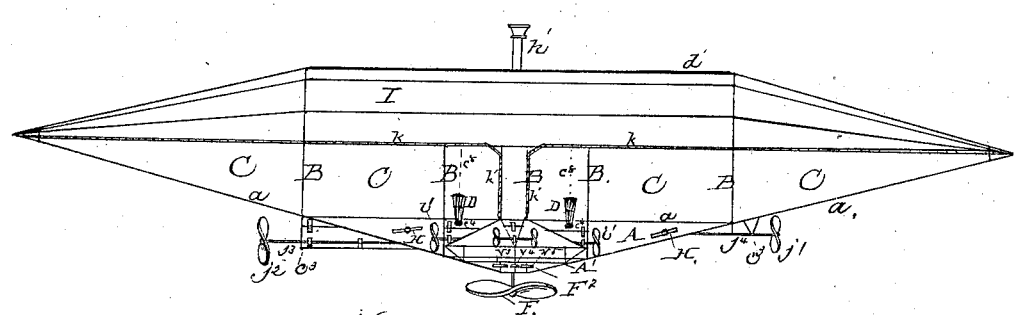
Figure 38:
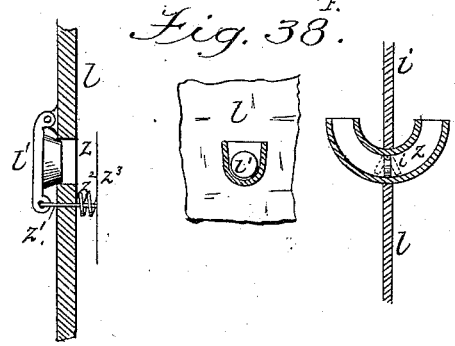
Figure 26:
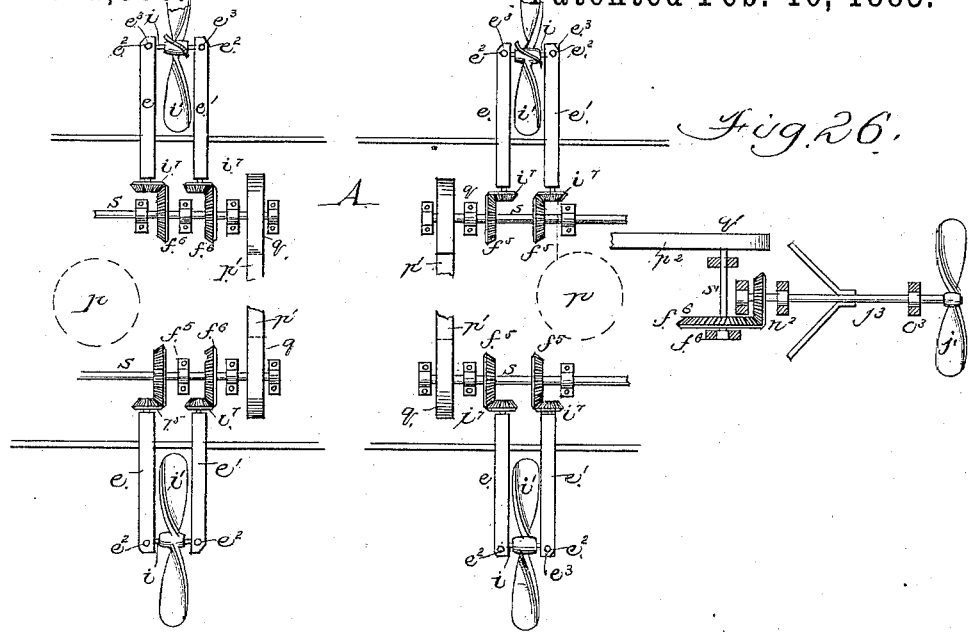
Figure 27:
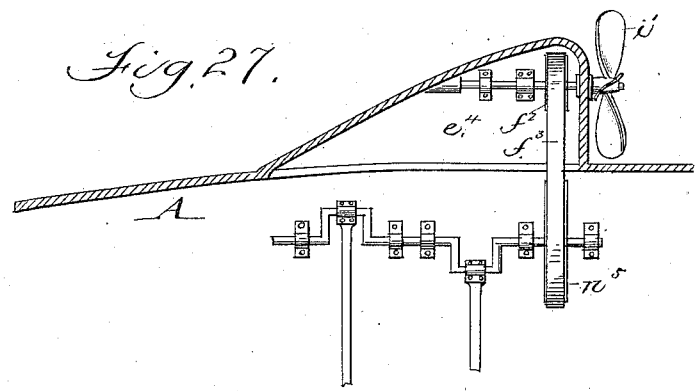
Figure 28:
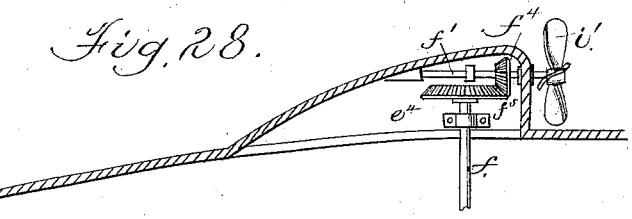

Figure 1 is a side elevation of the skeleton of the vessel, showing the chords, braces, and girders of the hull and cabin, the bulk-heads, and longitudinal chords and braces. Fig. 2 is the same, showing the gas-bags in place, and dots indicating the lashings, adjustable sheath to lower down and cover the central screw. Fig. 3 is a vertical longitudinal section of the same, showing the internal cellular construction of the gas-bags and connecting-valves, the air-sack, the neutral space amidships, smoke-stack, steam-pipes, and the hull, cabin, &c. Fig. 4 is a fragment of the same, showing the roof in place, with a hot-air chamber between the gas-bags and roof. Fig. 5 is a vertical cross-section of the same vessel, having a hexagonal frame, taken at one of the bulk-heads, showing the ribs, chords, bracings, stays, and girders therein, and the end of a section of the gas-bag beyond, and the hull, cabin, and compartments below the gas-field. Fig. 6 is a side elevation of the ship, showing a second upper chord designed to serve as a ridge-pole for supporting a roof on the vessel when one is used. Fig. 7 is a side elevation of a fragment of the same, showing the roof in place. Fig. 8 is an end elevation of the vessel, showing the roof and guttering. Fig. 9 is a vertical cross-section of a vessel cutting a gas-bag in two to show the internal cellular arrangement of the gas-bags and connecting-valves. Fig. 10 is a side elevation of an aerial vessel, showing the protruding cabin and steering-rudders at the ends, the connecting-gear, and stays. Fig. 11 is a plan of such vessel looking up from below, showing the steering device arranged in place. Fig. 12 is an end elevation of the same, showing the attached steering device and protruding cabin, &c. Fig. 13 is a detail of the frame for the steering-rudder. Fig. 14 is a side elevation of a fragment of a vessel, showing the diminishing protuberance or wheel-house on the side for receiving the axle-shaft of the side screw, and the side screw. Fig. 15 is a cross-section of a vessel taken at the diminished protuberances or wheel-houses, showing the screws, the relation of the engine and propelling-shafts. Fig. 16 is a horizontal section of the same, showing a plan of propulsive connections and actuating machinery. Fig. 17 is a horizontal longitudinal section, looking up from the bottom, showing the central raising and lowering screws and numerous variously-adjusted side propelling and end screws. Fig. 18 is an enlarged fragment of an aerial vessel, showing one modification of actuating-connection within the side protruding beams. Fig. 19 is a horizontal section of a vessel, showing a plan of two modifications of the horizontal beams, the side screws, and the connections with the propulsive machinery. Fig. 20 is a cross-section of a vessel, showing one modification of the steering and guiding fans, one open, the other closed. Fig. 21 is an enlarged view of one modification of the steering apparatus, showing its connections. Fig. 22 is a longitudinal vertical section of the hull of an aerial vessel, showing the arrangement and location of a central raising and lowering screw for regulating the rise and fall of the vessel, together with the connecting machinery. Fig. 23 is a side elevation of the same, showing the side propelling and fore and aft steering and central raising and lowering screws, the deflecting-fins, the fans, the hexagonal roof, the spouting, and guttering. Fig. 24 is a cross-section of an aerial vessel, showing the hexagonal bulk-heads, angle-blocks, roof, side propelling-screws, central raising and lowering screw, projecting hull, and cabin. Fig. 25 is an enlarged view of one modification of the raising and lowering screw and its connections. Fig. 26 is a plan of the propelling machinery, showing its general arrangement and connections with the side fore and aft screw. Fig. 27 is a detail of a part of the connection of the machinery. Fig. 28 is a modification of the same. Fig. 29 is another modification of the same. Fig. 30 is a plan of central hollow angle-block, showing right-angle connections. Fig. 31 is a plan of a terminal angle-block, showing horizontal connections and an internally-arranged brace, rubber bolster, and cushions to prevent abrasion, &c. Fig. 32 is another form of the same. Fig. 33 is still another form. Fig. 34 shows the connections of the frame. Fig. 35 are fragments of the combined tubing and cables. Fig. 36 is the same. Fig. 37 is a cross-section of a gas-bag, with the hull below, showing the air-sack. Fig. 38 is an enlarged view of the valves for connecting the compartments of the gas-bags. Fig. 39 is a floor-bracing support. Fig. 40 is a longitudinal section of frame-tubing, showing a line therein. Fig. 41 is a perspective of a fragment of the cross-girders and intersecting lacing-braces. Fig. 42 is another view of the same, showing the stanchions or post-supports. Fig. 43 is a vertical cross-section of the ship, showing the side fans and their gearing-connections and the cable for opening and closing them.

Similar letters of reference indicate corresponding parts.

With a view to perspicuity in describing my inventions and their cognate parts, I will divide my aerial ship into the hull A, including the bulk-heads and supports B, rising therefrom at intervals from stem to stern, the gas-field C and external supporting-frame, the guiding and steering apparatus, the propelling arrangement, and the raising and lowering device, and, so far as it may be done, will treat each part separately at first and then group them.

The hull A consists of a frame-work of top chords, $a\ a$, which are the bottom chords of the gas-field above, and a series of other longitudinal horizontal chords, $a'\ a^2\ a^3\ a^4$, and transversal or lateral chords $a^5$, upright stanchions or posts or ribs $a^6$, the joint intersections of all of which are secured by suitable angle-blocks or elbows, $b\ b'\ b^2$, and the whole is thoroughly stayed, braced, and tied by braces $c$, stays $c'$, and ties $c^2$. The flooring and partitions of the several floors and compartment of the hull are made of wire-netting, $c^3$, or other suitable material, properly secured and strengthened by cables and pipe-bracings $g^0$. The hull-frame is covered by a thin shell of any suitable non-combustible and water-proof material, and the hull protrudes downward sufficiently amidships to provide space and to furnish accommodations for the steam and dynamo engines, the machinery, fuel, gas-retorts, condensers, and gasometers, freight and store rooms, as well as compartments for living-rooms and business-offices, besides the cabin A', which is partly within and protrudes part of its depth below the hull proper, with a lookout below, from which central point all the movements of the ship are regulated and directed. Forming part of and rising upward from the hull A, at intervals from stem to stern, the size graduated to conform to the external shape of the vessel, is a series of metal bulk-heads, B, which may be hexagonal, octagonal, circular, or have any other desired outline form, constructed of tubing or channel-steel, chords $g$ $g'\ g^2$, secured by one end in a central angle-block, $b$, and diverging thence toward a periphery-chord, where the outer ends are secured in terminal angle-blocks $b^2$, which latter form part of the peripheral frame $g^3$, $g^4$, $g^5$, and $g^6$, and all the several parts and intersections are substantially stayed and secured. The vertical chord $g$ extends downward from the roof-chord $g^6$ to the lowest chord of the hull A, and is, by suitable angle-blocks, connected with and secured to each intersecting chord throughout its course. The lower periphery-chords, $g^3$, are extended down through the exterior walls of the hull to the lower longitudinal and transverse chords thereof, where, by suitable angle-blocks, they are connected and secured, while the lower diverging chords, $g^2$, intersect with and by suitable angle-blocks are secured to the periphery-chords $g^3$ and $g^4$, imparting strength thereto, and assist in maintaining the vertical and horizontal diameter of not only the hull, but the entire vessel, while the vertical chord $g'$, upper diverging chords, $g^2$, and periphery-chord $g^5$ $g^6$, and upper portion of chord $g^3$ contribute to furnish a supporting-base for the lower chords and strengthen the whole. The bulk-heads B are longitudinally stayed and supported in place by longitudinal chords $d$, $d'$, $d^2$, $d^3$, $d^4$, $d^5$, $d^6$, and $d^7$, which take root at each end of the vessel, in conjunction with chord $a$ and other longitudinal chords of the hull in common nodes, and, passing from stem to stern, over or through the periphery thereof, are attached to the several bulk-heads B at suitable points, as designated. The bulk-heads B separate the several sections of the gas-bags, and furnish suitable supports, to which they may be lashed or otherwise made fast. In lieu of the framework having diverging arms, as above described, it is obvious that any substantial form of frame may be adopted—as, for instance, that indicated by Fig. 34, in which $g^7$ is the periphery chord or rib, $g^8$ is a hollow vertical stanchion or post, and $g^9$ is a hollow lateral chord or girder. $b^3$ is an intermediate angle-block. $r'$ is a cable, which, passing through the periphery and transverse chords when made fast to or over the keys $r$, binds the whole together. $r^2$ is a truss-bracing, and $r^3$ are diagonal braces. $r^5$ is a rubber bolster or cushion introduced between the key-stay or steel pin, as well as between other wearing-points and the cables, guys, and stays, to prevent cutting and wear by friction, and to keep the parts taut and make them reciprocate with the inflections of the ship. The cable and chord are enlarged in Figs. 35 and 36. The entire frame, including the hull A, bulk-heads B, longitudinal, vertical, lateral, and diagonal chords, may be so constructed and connected that the air can be exhausted therefrom and its place supplied with gas.

At the points of intersection of the cables, bracing-chords, and angle-sleeves, as well as around the key-pin within the angle-blocks, also at the points of intersection within the tubing when cables or bracing-chords are there introduced, $r^5$ is a circular rubber cushion or bolster adjusted on the center and intersecting angle-blocks. $s^2$ is a rubber bolster or a rubber cushion at intersecting points to prevent abrasion or wear. The bellied or expanded portion of the hull is formed by lower or keelson longitudinal chords, $a$, intermediate longitudinal gunwale-chords, $a'$ $a^2$, one each on each side, central longitudinal supporting-chords, $a^4$, vertically below the center of the vessel, laterally-supporting cross-girders or lateral chords $a^5$, which extend in a series at proper intervals on each deck from stem to stern, and uprights, posts, or stanchions $a$, which also extend in series at proper intervals throughout the length of the ship; and these several chords are secured at central points by suitable intermediate angle-blocks, $b^2$, and at the outer ends by terminal or elbow angle-blocks $b^3$, and, like the hull of a water-craft, all external angles are reduced to the minimum, and it is built sharp fore and aft, with a view to retaining great strength and attaining speed, and offering but little resistance to the atmosphere and currents of air, so that in sailing the course will be as little affected thereby as possible. The hull A of the vessel may be inclosed by any suitable material, be divided into decks and such compartments as may be desired by any light, firm, fire, water, and gas proof material, like any other class of vessels. The cabin A′, which is constructed partly within, protrudes part of its depth below the hull proper, has outlooks $a^7$, doors, windows, and other facilities for entrance and exit, light and ventilation, and projecting external galleries, and from lines of guttering $k$, arranged along on the edge of the roof I, water spouts or ducts $k'$ conduct the water from the roof into suitable tanks within the hull. The deck or floor of each horizontal subdivision of the hull is supported by cross-girders or lateral chords $g^9$, supported as well by posts or stanchions $g^{11}$ as by several intersecting longitudinal chords, and is braced and secured by suitable interlacing braces, $c^9$, and covered by a wire mat overlaid with asbestus or any other fire-proof material.

Taking root within the hull A, and projecting therefrom in pairs on each side, opposite to each other, fore and aft of the center, are fixed hollow beams $e\ e'$, which furnish bearing for the axle-journals $i$ of the side propelling-screw, $i'$, as well as a sheathing or casing for the shafts $i^2$, carrying a gear-wheel, $i^5\ i^7$, respectively, one at each end, or endless belt $i^3$, through which the side screws are actuated or impelled on their axis, also for the gear-wheels $i^5$ or pulley-wheels $i^4$, secured on the axle-journal $i$. (See Figs. 18, 19, and 20.)

The beams $e\ e'$ should be of metal of great tensile strength, should be as light as is consistent with the strength required, and in diameter only sufficient to accommodate the shafting or belting working therein, be far enough apart to allow of mounting the screw between them and permit it to revolve freely, and need protrude beyond the side of the vessel but one-half the diameter of the screw $i'$, so as to permit the arms or blades of the screw to clear the side of the hull, and should be securely braced. Constructed in the outer end of each beam $e\ e'$ is a journal-boxing, $e^2$, which furnish bearings for the axles $i$ of the screw $i'$, and is provided with a lubricating-fountain, $e^3$, regulated and operated by a lever from within the vessel, for lubricating the axle of the screw and the journals of the impelling connecting machinery. In lieu of the protruding beams $e\ e'$, for carrying the side screws, $i'$, wheel-houses $e^4\ e^5$ may be constructed on and made to protrude from the side of the hull A. The wheel-houses may be continued along the entire side of the hull from screw to screw, or may fall away toward the center of the vessel in diminishing lines, as shown in Figs. 14, 15, 16, 27, and 28, as may be preferred, and need not protrude beyond the ship but a little over one-half the diameter of the screw $i'$, and the depth vertically need be but sufficient to provide room for the machinery and give strength to the house and security to the screws. When the wheel-houses are employed, the axle-shafts $f'$ of the side screws, $i'$, running parallel with the side of the vessel, enter the wheel-house at its larger end and take bearings in the wall thereof at the point of entrance, as well as in suitable journal-boxings arranged therein, thus bringing the screw $i'$ against the abrupt end of the wheel-house $e^4\ e^5$, where, revolving on its axis, it is interposed between the obtuse end of the wheel-house and the currents of air, thus cutting off any abrupt angle or prominent feature that could be affected by adverse air-currents. Within the wheel-houses $e^4\ e^5$ the shafts $f'$ may be made to carry either a pulley-wheel, $f^2$, through which it can be actuated by an endless belt, $f^3$, passing around a propelling-drum, $n^5$, or a gear-wheel, $f^4$, and be actuated by gear-wheel $f^5$, carried on a shaft, $f$, as shown in Figs. 27 and 28.

My vessel is not circumscribed to either of these forms of mounting the propelling-screws. I merely show and describe these two forms, as I prefer them to the less secure revolving shaft.

Protruding downward from and forming part of the keelson-chord $a$, fore and aft, one at each end, are parallelogram form metal frames $o$, in which the larger end of the rudder $j$ is geared and moves. The horizontal upper and lower sides, $o'$, of the frame $o$ form the segment of an arc, and are provided with tracks, either cogged or otherwise, or with ways $o^2$, on or in which wheels $o^3$ on the upper and lower corner of the rudder $j$ move, and in the vertical sides $o^4$, at both top and bottom, or but midway, as may be preferred, are arranged pulley-wheels $o^5$, over which the tiller or steering cables $o^6$, used in operating the rudder $j$, are carried; also, other protuberances, $o^7\ o^7$, to which the smaller ends of the rudder $j$ are secured, form part of the under side of the hull, fore and aft of the center. Passing out through the bottom of the cabin A′ is a well, F$^2$, within which is housed the raising and lowering central screw, F, mounted on the movable carriage F′, by which it is lowered beneath the vessel, when required for use, or raised into the well when it is to be housed, all of which will be described hereinafter. There are also secured to and protruding from the hull A, fore and aft, arbors or pendent brackets $e^3$, in which the fore and aft propelling and steering screws $j'\ j^2$ take bearings.

On the sides of the hull A, at a point sufficiently removed from the side screws, $i'$, are openings provided with collars $c^t$, through which shafts $c^5$, carrying adjustable guiding and steering fans D, protrude from within the vessel. The fans D are constructed to open and close, and may be adjusted at any angle, and are operated by chains or cables $c^8$, passing over pulleys $c^7$ to within the interior of the vessel through dead-eyes in the hull and over the gas-field, or over suitable projections, and down into the hull. In addition to the fans D, at intervals along the outside of the hull, are arranged movable fins H, employed for regulating the altitude of the vessel's flight. The fins H are secured on revolving shafts operated from within the vessel, and so constructed that by turning the shafts the fins can be set simultaneously at any desired angle and be employed for deflecting the vertical course of the vessel and ascending or descending in passing over mountains, or for raising or descending from one air-current to another, or they may lie parallel with the longitudinal of the ship and aid in retaining its equilibrium, or, when crossing air-currents, or at other times when required to aid in directing the course of the vessel, the fins H may be employed as sails or steering aids.

The vessel is given buoyancy—to equipoise—by a gas-field consisting of a series of cylindroid receptacles, C, constructed of silk, canvas, thin metal, or other suitable material, made gas, fire, and water proof, of sizes to fill the several spaces between the bulk-heads B, and internally divided by suitable partitions, $l$, into compartments communicating with each other by automatic valves $l'$, modifications of which are shown in Fig. 38. The gas-receptacle C is secured in its seat between the bulk-heads B by lashing or otherwise, so that it becomes, as it were, a part of the whole, and is connected by a supply-pipe, $l^2$, and an exhaust-pipe, $l^3$, with a reservoir within the vessel.

C' is a flexible air-sack, of the same material as the gas-receptacle, or of any other suitable air or gas proof material, and of any suitable form and dimensions, terminating in a small neck or outlet-orifice provided with outlet and inlet valves $l^4$ and $l^5$, respectively, through which air is admitted or ejected from the sack, as herein set forth. The air-sack C' is introduced wholly within the gas-receptacle C, and is by its narrow neck secured to an opening of proper dimensions in the outer wall of the gas-receptacle in such a manner that the joint will be absolutely gas-proof, and the valves $l^4$ and $l^5$ will protrude beyond the outer wall of the gas-field. The air-sack C' is designed to afford relief to the gas-receptacle when ascending into higher altitudes, and to aid in retaining an equipoise at various altitudes—that is to say, the air-sack C', inflated before starting from the earth, occupies certain space within the gas-receptacle, and contains an atmosphere of from fourteen to fifteen pounds density per square inch. As the vessel ascends into mid-air, and the external pressure is relieved, the tendency of the gas in the gas-receptacle is to expand, and thus endanger its jacket. By opening the valve $l^4$ the air in sack C' is permitted to escape and the sack to collapse sufficiently to relieve the pressure, and by opening the valve $l^5$ an atmosphere of the density then surrounding the vessel is permitted to flow in.

Should it become necessary to vary the buoyancy for ascending into higher or descending into lower strata of the atmosphere, by deflecting the side fins, H, so as to carry the vessel upward or downward, as the case may be, the valves $l^4$ and $l^5$ being left open, the density of the air in the sacks C' is changed for the atmosphere of the altitude then attained, and then the valves being closed this atmosphere serves as a ballast, thus obviating the necessity of throwing out other ballast or permitting the buoying gas to escape and be wasted. Any character of automatic valve, $l'$, may be employed in the partitions $l$ within the gas-receptacle, the whole purpose being to equalize the pressure of the gas in each compartment or subdivision. Amidships of the vessel, where the smoke-stack and other pipes are carried out through the upper part of the vessel, the gas-bags are made to conform to the well $h$, so that there will be no danger from contact with fire or other heat, and as another means of protection from fire, when desired, the vessel may be overlaid with a thin metal roof, I, using the chord $d'$ as a ridge-pole. In that event a water-duct, $k$, can be constructed along the eaves of the roof, as on a house, and thus secure necessary water. A netting, K, may be thrown over the gas-field and be employed in lashing and securing it in place.

D is a fan, which opens and closes on a knuckle-joint, $c^6$, at the end of an arm, $c^5$, passing from within out through the sides of the vessel's hull A, at intervals, fore and aft on both sides of the vessel, and is employed, like sails, to aid in steering the vessel. The fan D consists of a number of ribs secured at one end, and covered by any textile or other flexible fabric that will serve the purpose, and is operated, opened, and closed by a cable or chain, $c^8$, passing over pulleys $c^7$ to within the vessel, where it is handled by suitable machinery.

E is the steering apparatus, of which $j$ is the rudder. $o^3$ are wheels on the movable end of the rudder. $o^7$ is the hinge-joint at the inner end. $o^6$ are steering cables or chains. $o^5$ and $o^8$ are pulley-wheels. $o^2$ is a track or way in which the rudder moves. $o\ o'$ is a frame wherein the rudder is operated. $o^9$ is a drum over which the tiller-chain passes, and $o^{10}$ is the reciprocating steering-lever. The rudder $j$ is a triangulated frame covered with thin metal or any textile fabric, made light and strong, and to extend nearly the entire length along the under side of the conic ends of the ship at both ends. The inner or smaller ends of the rudders are pivoted at $o^7$ to a protuberance amidships on the under side of the hull, and the larger end extends fore and aft to the frames $o$, where they are mounted and secured, as shown. At each corner of the larger end of the rudder $j$ is adjusted a wheel, $o^3$, which treads on, in, or gears with the track $o^2$, secured in the form of a segment of an arc of a circle in the horizontal bars $o$ $o'$ of the parallelogram frame $o$. The wheels $o^3$ may be cogged, have a concave or convex face, and so the tracks $o^2$ must correspond to the face of the wheels, so that the whole will move harmoniously. The rudder $j$ having been pivoted at the inner and small end $o^7$, and the large end with the wheels $o^3$ mounted in the frame $o$, a cable, $o^6$, is attached to each side of the larger end of the rudder $j$, and, passing over the pulley-wheels $o^5$ in the uprights of the frame $o$, is carried amidships, and passes over the drum $o^9$ through pulley-wheels $o^8$ to the steering reciprocating lever $o^{10}$. When constructed and mounted as indicated, by moving the reciprocating lever $o^{10}$ to the one side or the other, the rudder $j$ can be moved in the direction desired, like the rudder on a water-craft, and as the rudder extends along the under side of the angle of the vessel, like a fin on a large fish, it readily changes the course of the vessel.

The vessel is propelled, as hereinbefore pointed out, by propelling-screws $i'$, arranged at intervals on the sides, a forward propelling-screw, $j'$, and an after propelling and steering screw, $j^2$. The screw may be constructed of an axle and hub combined, provided with journals $i$, and projecting from the hub, at suitable intervals, a metal frame having the wind requisite to give the screw the necessary and desired pitch or tread. These frames are covered, to work both ways, with thin metal or other suitable material, forming thereby screw-blades, and the screw may have as many of these blades as practical experience may demonstrate are advantageous. The fore and aft screws, $j'$ $j^2$, are mounted on the ends of their respective axle-shafts $j^3$ $j^4$ under the tapering ends of the hull in brackets $c^3$, projecting therefrom, and the axle-shafts $j^3$ $j^4$, which pass along on a line parallel with the keelson-chord $a$, enter the hull A fore and aft through suitable journal-bearings, where, by any suitable device within the vessel, they are geared to the propulsive machinery, hereinafter described.

When the side screws, $i'$, are mounted in journal-boxes $e^2$ in the projecting beams $e$ $e'$, they carry on the journal-shaft $i$, preferably one at each end, vaults or pulley-wheels $i^4$, which connect with and are propelled by the drum or band wheel $n^3$ within the vessel through the endless belts $i^3$ or gear-wheels $i^5$, which connect with and are propelled by the gear-wheels $f^5$ within the hull through the shaft $i^2$, carrying gear-wheels $i^6$ $i^7$, one at each end. The screw $i'$ being properly mounted and carrying gear-wheels $i^5$ on each axle, the shafts $i^2$ carrying gear-wheels $i^6$ and $i^7$, one at each end, mounted within the projecting beams $e$ $e'$, the gear-wheels $i^6$ gearing with the gear-wheels $i^5$ on the screw-axle, and the gear-wheel $i^7$ gearing with the propulsive gear-wheels $f^5$ within the vessel, it can be readily actuated to revolve forward or backward, or, rather, either way, at the will of the driver; but when the side screw, $i'$, mounted on its axle-shaft $f'$, is adjusted in place at the end of the projecting wheel-house $e^4$ $e^5$, and the shaft $f'$ within the wheel-house mounts a gear-wheel, $f^4$, it connects with and is propelled by a driving gear-wheel, $f^5$, within the vessel through a connecting-shaft, $f$, carrying a gear-wheel, $f^3$ $f^6$, at each end, as shown in Fig. 28; but when carrying a pulley or band wheel, $f^2$, connection is made and the screw is actuated through the belt $f^3$ by the drum $n^5$ within the vessel, as shown in Fig. 27. The several impelling gear-wheels $f^5$ and drums or band-wheels $n^5$ may be propelled or actuated by the same general train of propulsive machinery, arranged within the hull of the vessel, as indicated by Fig. 26, and when the connections are made all the side and fore and aft screws may be actuated simultaneously, or any one or more of them may be operated, as desired.

While I describe and use the train of propelling machinery shown in Figs. 26, 27, and 28, believing that to be the most suitable now of any known, I claim the right to adopt and use in my vessels the most approved and best adapted machinery for propelling aerial vessels.

The vessel may carry but one powerful engine, or carry two, four, or more lesser engines, whichever may be found to best serve the ends in view. By circular dotted lines I indicate two engines, $p$, one to each group, consisting of two side and one fore or aft screws, which through beltings $p'$ $p^2$ communicate momentum to band-wheels $q$ $q'$, secured on general shafts $s$ $s'$, which carry gear-wheels $f^5$ $f^6$, or a band-wheel, $n^3$, and gear-wheel $f^6$, as may be selected. The belts $p'$ connect machinery (not shown) with the pulley-wheel $q$, secured on shafts $s$, carrying gear-wheels $f^5$, which gear with the wheels $i^7$ on shafts $i^2$, and through them communicate momentum to the side screws, $i'$, or with pulley-wheels $n^3$, which, through endless belts $i^3$, communicate momentum to the side screws, $i'$, revolving them on their axis either simultaneously or separately, as may be desired; or, if preferred, momentum may be communicated directly to the side screws from the engine by connecting-arms $n$ $n'$ with the shaft $s$, as shown in Fig. 16. The belts $p^2$ connect machinery (not shown) with the pulley-wheel $q'$, secured on shaft $s'$, carrying a gear-wheel, $f^6$, which gears with gear-wheel $n^2$, secured on the inner end of the fore or aft axle-shafts, $j^3$ $j^4$, and revolves it on its axis. Within the hull, and connected with the same propulsive power, is machinery for handling the fins, the fans, and steering apparatus, and raising and lowering screws; but as I have now pending separate application for patents on improvements for steering apparatus for aerial vessels, fans, and fins for regulating the flight and guiding aerial vessels, and for improvements in screws for raising and lowering aerial vessels, though I show these features in my drawings and describe them herein, I do so for no other purpose than to show their general relation to the ship, but with no purpose of claiming them, broadly, in this application, wherefore I do not deem it essential to describe them in detail.

F' is a hollow movable carriage, of any suitable material, within which the axle-shaft $v$ of the raising and lowering central screw, F, is mounted and takes bearing. The carriage F' may have any external form, and is provided at top and bottom with external projections or collars, $w\,w'$, which prevent the carriage going too far in either direction. Along the sides, between the shoulders $w\,w'$, the carriage F' is provided with a racked gear, $u$, by which it is moved upward and downward, and in which gear cogged wheels $u'\,u^2$, secured on revolving shafts and impelled by actuating machinery, (not shown,) which lower and raise the screw F into and out of position. The cylindrical bore $v^2$ within the carriage F' extends wholly through from end to end, and near both ends has recessed journal-boxings $v^3$, in which the collar or projecting journals $v'$ on the axle-shaft $v$ take bearings, and by which the screw is supported.

F is a screw, like the side and fore and aft screws, mounted on an axle-shaft, $v$, having journal protuberances $v'$ near each end, and carrying on the end opposite to the screw a gear-wheel, $u^3$, which gears with the gear-wheel $u^4$, carried on the shaft $u^5$, by which the screw F is propelled when lowered into position. The screw F is mounted in a movable carriage, F', and is actuated by gear-wheel $u^3$, gearing with the gear-wheel $u^4$, connected through shaft $u^5$ with propulsive machinery within the vessel, but not shown. The raising and lowering screw F, with its carriage and propulsive machinery, is adjusted in a well, F$^2$, passing up through the under side of the hull A, and, when not required for use, by the gear-wheels $u'\,u^2$, is raised into and housed within the well, but, when required for raising and lowering the vessel, is, by the same machinery, lowered below the hull A until the wheels $u^3$ and $u^4$ gear, when it is made to revolve in either direction.

I do not confine myself to this mode of mounting and actuating the raising and lowering screw, as I have several modifications of this device, and show another in Figs. 22 and 23, where $v$ is the shaft carrying the raising and lowering screw F, $v^4$ is a band-wheel thereon, and $v^5$ propulsive band-wheels to which it is belted.

$l'$ is an automatic trap-valve secured in the partitions $l$ of the gas-field C, and may be of any approved form. In my Fig. 38 I show four different forms, each of which contemplates the use of pressure on the one side and want of resistance on the other. The trap $l'$ is adjusted in an orifice, $z$, in the partition $l$, is hinged at one end, and by the other is attached to a lever, $z'$, carrying a spring, $z^2$, and surmounted with a broad disk, $z^3$. There being greater pressure on the disk $z^3$ than on the valve $l'$, the trap will open and permit the gas to pass through the orifice $z$, and when the pressure is equal the trap closes.

$h$ is a well or chimney formed by a central bulk-head, B, through which steam and the smoke-stack $h'$ pass.

The frame of the vessel having been constructed and inclosed as indicated, the gas-field C secured in place, and the roof I adjusted in place, and the internal propelling machinery put in, and connections made with the side fore and aft screws and central raising and lowering machinery, as indicated, and the vessel freighted, the gas-bags are inflated so that the ship at zero will stand at equipoise. The machinery is then put into motion and connection made with the central screw, which carries the vessel up into mid-air, when the side and fore and aft or fore or aft screws are connected and set to work, by which means the vessel is driven forward, being directed in its course by the after screw $j^2$, the rudder $j$, the fans D, or fins H, or all or either of them. When the vessel has attained the height desired, the central screw is disconnected and housed, and the altitude of the vessel is then governed by the fins H and the fans D, and, when desired, vertically lowered by the central screw. In passing over mountains and valleys, conforming to the elevations of the country being traversed, the fins H may be set at angles designed to gradually raise and lower the vessel, so that it will retain, if desired, a uniform altitude, to which end the fans, employed principally for steering purposes, can be made to contribute by being also set at an angle.

Though I have shown in my drawings and set out somewhat in detail in my specifications the form, construction, manner of mounting, and mode of operating central vertical screw for vertically raising and lowering aerial vessels, the mode of mounting, handling, and operating side propelling and end propelling and steering screws for aerial vessels, the form, mode of construction, and manner of mounting, handling, and using side fans and end rudders for deflecting the lateral course of aerial vessels, and the form, mode of construction, and manner of mounting and handling side fins for varying the vertical flight of aerial vessels, having heretofore in my several applications dated November 8, 1883, and numbered, respectively, 111,236, 111,237, 111,238, and 111,239, and now pending in the United States Patent Office, asked that Letters Patent be granted to me protecting, respectively, these specific features, I do not claim them here, but simply incorporate them to show the relation of one part to another and each to the whole.

Having now fully described my invention, what I esteem as novel, and desire to protect by Letters Patent, is—

1. In aerial vessels, a hull made sharp fore and aft and constructed on one general frame of metal tubing, so arranged and united together by hollow angle blocks at every intersecting point, as shown, and so secured at the points by packing, that the entire frame may be exhausted of air and filled with gas, substantially as indicated.

2. In vessels for aerial navigation built sharp at both ends, a common hull constructed on one general frame of metal tubing, arranged and united together by hollow angle-blocks at every intersecting point, as shown, and expanded amidships to make room for a number of decks and a protruding cabin, and having, and in combination with, a series of lateral frame bulk-heads rising therefrom at intervals from stem to stern to the height of the gas-field and forming supports therefor, said bulk-heads constructed of metal united by angle-blocks at every intersecting point, and stayed and strengthened by horizontal, vertical, and diverging braces and peripheral chords, substantially as shown and described.

3. In vessels for aerial navigation comprising a hull expanded amidships to accommodate one or more decks and a cabin, a series of radially braced and supported transversely-arranged metal bulk-heads rising out of the hull at intervals from stem to stern and extending upward at varying heights to and beyond the periphery of the gas-field for supporting the vessel laterally, and providing seats and support for the several gas-receptacles, substantially as set forth.

4. In vessels for aerial navigation, the combination of a sharp tapering metal hull, A, expanded amidships to accommodate one or more decks and a cabin, a series of radially braced and supported transversely-arranged metal bulk-heads, B, rising at intervals from stem to stern out of the hull, and extending upward to the circumference of the gas-field, gas-receptacles C, arranged between and secured to the bulk-heads, and longitudinal bracing-chords $d\ d'\ d^2$, the whole constructed and adapted substantially as shown and described.

5. In radially braced and supported transversely-arranged metal bulk-heads rising out of the hull of vessels for aerial navigation, intersecting intermediate terminal elbow and sleeve angle-blocks for securing the several joints, key-bolts, and tying-cables, substantially as set forth.

6. In vessels for aerial navigation, the combination of a metal hull made sharp fore and aft and expanded amidships to accommodate more than one deck and cabin, a series of radially braced and supported transversely-arranged metal bulk-heads rising at intervals therefrom from bow to stern, and a number of gas-receptacles arranged between and secured to such hull and bulk-heads, the whole provided with side and end propelling and steering screws, side adjusted vertically-deflecting fins, side adjusted laterally-deflecting fans, steering-rudders arranged on the under side of the hull, and a vertical raising and lowering screw, all constructed, arranged, and adapted substantially as shown and described.

7. In vessels for aerial navigation, the combination of a metal hull-frame made sharp fore and aft, thoroughly secured at several intersections, and divided internally into decks and a cabin, series of transversely-arranged radially-braced bulk-heads rising out of such hull at intervals from bow to stern, series of gas-receptacles arranged and secured in place between the bulk-heads for buoying the ship, together with a central screw for raising and lowering the vessel vertically, side propelling-screws adjusted in fixed supports for impelling the vessel forward, adjustable fans ranged along both sides of the hull for deflecting the course of the vessel laterally, and adjustable fins ranged along on both sides of the hull for deflecting the course of the vessels vertically, the whole constructed and arranged for buoying, supporting, propelling, and steering laterally and vertically aerial vessels, substantially as described and shown.

8. In vessels for aerial navigation, the combination of a properly-braced metal hull-frame thoroughly secured at several intersections and divided internally into decks and a cabin, series of transversely-arranged radially-supported bulk-heads rising out of such hull at intervals from bow to stern, gas-compartments arranged between and secured to such bulk-heads and the hull, longitudinal bracing-chords extending over the gas-field from stem to stern, and central vertical screw for raising and lowering the vessel, substantially as pointed out.

9. In vessels for aerial navigation, a segregated gas-field consisting of a series of receptacles or gas-bags constructed of any suitable material, and of a size to adjust between and be secured to the several bulk-heads B, which rise out of the hull, each section or receptacle internally divided into compartments or cells by intersecting gas-proof partitions containing each one or more automatic valves and provided with an internally-adjusted air-sack secured by its mouth to an opening in the periphery of the gas-receptacles, the said air-sack provided with induction and eduction pipes $l^4\ l^5$, through which communication is maintained with the outer air, the whole constructed and adapted substantially as shown and described.

10. A segregated gas-field for aerial vessels constructed of silk, canvas, thin metal, or other suitable material, and internally divided by partitions provided with automatic valves for equally distributing the pressure of the gas into cells or compartments, and furnished with air-induction pipes for inflating and eduction-pipe for exhausting the same, also provided internally with an air-sack secured by its mouth to the periphery, where, through induction and eduction valves, it communicates with the outer air, and also provided externally with flaps and other conveniences for handling and securing such gas-bag in its seat, the whole constructed and arranged substantially as and for the purpose described.

11. In combination, segregated gas-field C, internal partitions, $l$, provided with automatic valves $l'$, air-sack $c'$, the latter provided with air-valves $l^4$ $l^5$, the whole constructed, arranged, and adapted substantially as shown and described, for floating and buoying vessels for aerial navigation.

12. In segregated gas-field for vessels for aerial navigation, an internally-arranged gas-tight air-sack secured by the mouth to an orifice in the shell, and provided with induction and eduction valves, and adapted and designed to be inflated and collapsed within the gas-receptacle, for the purpose and substantially as pointed out.

13. In vessels for aerial navigation constructed on one general frame of metal, made sharp fore and aft, projecting wheel-house $e^4$ $e^5$, in combination with side propelling-screws, $i$, axle-shaft $f'$, engaging gearing, as shown, and internally-arranged impelling machinery for propelling such vessels, substantially as pointed out.

14. In vessels for aerial navigation, hull A, having projecting wheel-houses $e^4$ $e^5$ on each side, in combination with side propelling-screws, $i$, axle-shaft $f'$, and connecting-gearings $f^4$, $f^5$, and $f^6$, for engaging with propulsive machinery within the hull for impelling such vessels, substantially as shown and described.

15. In vessels for aerial navigation, wheel-houses protruding from the sides of the vessel's hull for supporting side propelling-screws, substantially as indicated.

16. In a device for laterally steering vessels for aerial navigation, the combination of long fin-shaped rudder-blades $j\ j$, pivoted and secured by their smaller ends $o^7$ near the base, and extending fore and aft along and conforming to the tapering under side of the conic ends of the vessel, and provided with travelers $o^3$ on the corners of the outer end, parallelogram frame $o\ o'\ o^4$, secured to and projecting downward from the vessel and provided with tracks or ways $o^2$ at bottom and top, steering-cable $o^6$, pulley-wheels $o^5$ $o^8$, drum $o^9$ for the tiller-cables, and steering-wheel $o^{10}$, the whole constructed and arranged substantially as pointed out.

17. Vessels for aerial navigation, comprising a segregated gas-field and hull, the latter constructed on one general frame, of metal, and expanded and protruded amidships, and divided internally into floors or decks, a cabin, living-compartments, and a pilot-house, and having metal bulk-heads extending upward therefrom at intervals from bow to stern through and to the height of the gas-field, and actuated, steered, and guided by internally-arranged machinery through externally mounted and adjusted side propelling-screws, end propelling and steering screws, and a central raising and lowering screw, and under adjusted rudder-blades, in combination with a series of adjustable fans secured by knuckle-joint to protuberances on the side of the hull, along the sides of the vessel on both sides at intervals from stem to stern, for directing the lateral course of the vessel, and with cable $c^8$, pulley-wheel $c^7$, and machinery within the vessel, substantially as shown and described.

18. Vessels for aerial navigation, comprising segregated gas-field and hull in compact form, the former constructed to adjust between the bulk-heads rising from the hull and internally provided with partitions and an air-sack, and the latter constructed on one general frame, of metal, sending lateral metal bulk-heads up through to the height of the gas-field, and expanded at the waist into space for decks, cabin, and pilot-house, in combination with series of adjustable fans secured by knuckle-joints to protuberances on the vessel's hull along on both sides at intervals from bow to stern, for directing the lateral course of the vessel, and with cable $c^8$, pulleys $c^7$, and machinery within the vessel, substantially as shown and described.

19. In combination, the metal vessel-hull A, side fans, D, knuckle-joint $c^6$, cable $c^8$, pulleys $c^7$, and internally-arranged machinery within the vessel, the whole constructed and arranged to act as aids in steering the vessel laterally, substantially as shown and pointed out.

20. Vessels for aerial navigation, comprising a segregated gas-field and hull, the latter constructed on one general frame, of metal, expanded and protruded amidships, and divided internally into floors or decks, a cabin, living-compartments, and a pilot-house, and actuated, steered, guided, and handled by internally-arranged propulsive machinery through externally-mounted side propelling-screws, end propelling-screws, and under adjusted rudder-blades, in combination with a series of adjustable side fins carried on revolving shafts passing through the hull to within the vessel at intervals along both sides from bow to stern, and with machinery internally arranged for handling the same, the whole constructed and adapted for deflecting the vertical flight of the vessel, substantially as shown and described.

21. Vessels for aerial navigation, comprising a segregated gas-field and hull in compact form, the former constructed to adjust between the bulk-heads rising from the hull, and internally provided with partitions and an air-sack, and the latter constructed on one general frame, of metal, and sending lateral bulk-heads up through to the height of the gas-field, and expanded amidships into space for decks, cabin, and pilot-house, in combination with series of adjustable fins mounted on revolving shafts passing through the hull at intervals from bow to stern on both sides to within the vessel, and with machinery internally arranged for handling the fins, the whole constructed and adapted for deflecting the vertical flight of the vessel, substantially as shown and described.

22. In combination, the segregated gas-field C, metal hull A, side fins, H, mounted on a revolving shaft passing through the hull to within the vessel, and internally-arranged propulsive machinery, the whole arranged and adapted for deflecting the vertical course of the vessel, substantially as pointed out.

23. In vessels for aerial navigation, a segregated gas-field and hull, the former arranged in sections to adjust between the bulk-heads, and provided internally with partitions, an air-sack, and automatic valves, and the latter constructed on one general frame, of metal, sending upward lateral bulk-heads at intervals from bow to stern through and to the height of the gas-field, and expanded and protruding amidships into waist, horizontally and vertically divided into decks, living-compartments, a cabin, and pilot-house or outlook, and provided with protruding wheel-houses for supporting the side propelling-screws, $i$, arranged along the sides of the hull of the vessel, in combination with side propelling-screws, $i$, axle-shaft $f'$, and connecting-gearings $f^4$, $f^5$, and $f^6$, for engaging with propulsive machinery within the vessel for impelling the side screws, the whole constructed and arranged substantially as shown and described.

24. In combination, the vessel's hull A, constructed on one general frame, of metal, end screw, $j'$, axle-shaft $j^3$, suspender bracket and bearings $c^3$, gear-wheel $n^2$, shaft $s'$, pulley-wheel $q'$, endless belt $p'$, and propulsive machinery to act as aids in propelling and steering vessels for aerial navigation, constructed and arranged substantially as shown and described.

25. In a train of propulsive machinery for actuating the side screws, $i'$, the combination of endless belt $p'$, pulley-wheel $q$, and gear-wheels $f^4 f^5$, secured on and carried by revolving shaft $s$, gear-wheels $i^7 i^7$, revolving shafts $i^2$, and gearing-wheels $i^6 i^5$, the whole constructed, adapted, and arranged as shown, for connecting the motor-power within the vessel with and actuating the side propelling-screws, substantially as pointed out.

26. In a train of propulsive machinery for actuating the end propelling and steering screws, $j'$, the combination of endless belt $p^2$, pulley-wheel $q'$, and gear-wheel $f^6$, both secured on revolving shaft $s'$, gear-wheel $n^2$, and revolving shaft $j^3$, constructed, arranged, and adapted as shown, for connecting the motor-power within the vessel with and actuating the end propelling and steering screw, substantially as shown and described.

27. In vessels for aerial navigation built in compact form, and comprising a segregated gas-field and hull, the latter constructed on one general frame, of metal, and the whole propelled, steered, and handled by trains of internally-arranged machinery through externally-arranged side and end screws, steering-rudders, fans, and fins, and raised and lowered by a central vertical screw, a thin metal protruding roof, I, extending over the upper part of the vessel from bow to stern, supported by lateral and longitudinal chords, in combination with water-ducts $k$ along the eaves, the whole arranged substantially as shown and described.

28. Hollow angle-block $b^2$, having receiving branching arms, as shown, in combination with central key-pin, $r$, and internally-arranged tying-cable $r'$, designed and adapted for forming the external joints in the metal frame of vessels for aerial navigation, substantially as shown and described.

29. Hollow central branching angle-blocks $b$, having receiving radiating arms, as shown, in combination with central key-pin, $r$, internally-arranged tying-cable $r'$, designed and adapted for forming the interior joints in the metal bulk-heads, and in the frame of vessels for aerial navigation, substantially as shown and described.

30. Hollow elbow and sleeve angle-blocks $b'$ and $b^3$, having right-angle and curved peripheries and radiating receiving joints, in combination with internally-arranged tying-cable designed and adapted for forming the corner and peripheral joints of metal frames for vessels for aerial navigation, substantially as shown and described.

31. Hollow angle-blocks having branching receiving-arms, in combination with a central key-pin and an internally-arranged tying-cable constructed and adapted for forming the joints in the metal frames for vessels for aerial navigation, substantially as pointed out.

32. In a metal frame for vessels for aerial navigation, the combination of hollow angle-blocks, having radiating receiving-arms, and provided with a central key-pin, longitudinal and lateral supporting-chords, vertical supporting-posts, diagonal bracings, and peripheral chords, all substantially secured at their several intersections, as shown and described.

33. The combination of the longitudinal, peripheral, lateral, and diagonal chords, as shown, the vertical stanchions or posts, the central, intermediate, terminal elbow and sleeve angle-joints, central key-pin, $r$, rubber bolsters $r^5$, cushions $s^2$, and tying-cables $r'$, arranged within the parts, the whole constructed and adapted for uniting the parts and strengthening the metal frames of vessels for aerial navigation, substantially as shown and described.

34. The combination of supporting posts or stanchions $g^{11}$, cross-girders $g^9$, and intersecting braces $c^9$, the whole overlaid with wire matting and covered by fire-proof material, and arranged and adapted to serve as a deck or floor for vessels for aerial navigation, substantially as shown and described.

In testimony whereof I affix my signature in presence of two witnesses.

EUGENE F. FALCONNET.

Witnesses:
A. L. DE LONG,
E. PARDON.